United States Patent [19]

Rakestraw

[11] 4,250,666
[45] Feb. 17, 1981

[54] SUPPORTING STRUCTURE FOR PLANTS

[76] Inventor: Roy R. Rakestraw, Rt. 1, Box 80, Lamar, Mo. 64759

[21] Appl. No.: 28,848

[22] Filed: Apr. 10, 1979

[51] Int. Cl.³ ............................................. A01G 9/02
[52] U.S. Cl. ........................................ 47/83; 47/39; 47/65; 47/DIG. 6; 211/131; 312/135; 312/223
[58] Field of Search ...................... 312/125, 135, 223; 211/127, 129, 131; 47/39, 82–83, 65, 17, DIG. 6

[56] References Cited

U.S. PATENT DOCUMENTS

| D. 224,746 | 9/1972 | Kyle ..................................... 47/39 X |
| 764,307 | 7/1904 | Scahill ..................................... 47/39 |
| 2,244,677 | 6/1941 | Cornell ..................................... 47/17 |
| 2,310,718 | 2/1943 | Teach ............................... 312/135 X |
| 2,803,923 | 8/1957 | Pratt ......................................... 47/83 |
| 3,360,885 | 1/1968 | St. Clair ..................................... 47/39 |
| 3,529,379 | 9/1970 | Ware ......................................... 47/17 |
| 4,006,559 | 2/1977 | Carlyon ..................................... 47/39 |

OTHER PUBLICATIONS

Indoor Lighting, U.S.D.A. Home & Garden Bull. #220, Feb. 1978, p. 37 cited.

Primary Examiner—Robert E. Bagwill
Attorney, Agent, or Firm—Clarence A. O'Brien; Harvey B. Jacobson

[57] ABSTRACT

A device is disclosed for supporting plants for decorative or gardening purposes. A plurality of rotatable or fixed trays or shelves are mounted on a central support, and shelves can optionally be added on the sides of the device, such as adjustable shelves for potted plants.

11 Claims, 9 Drawing Figures

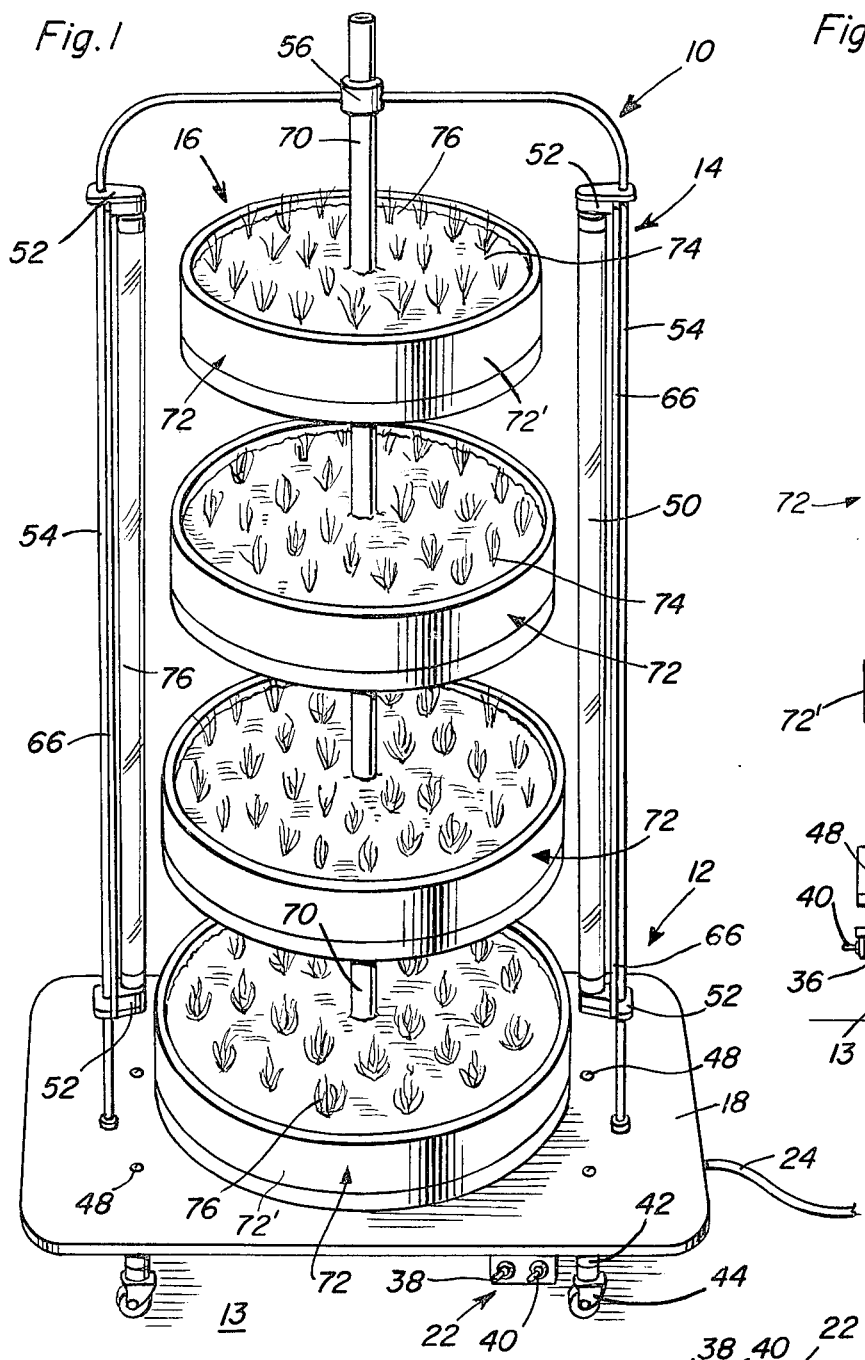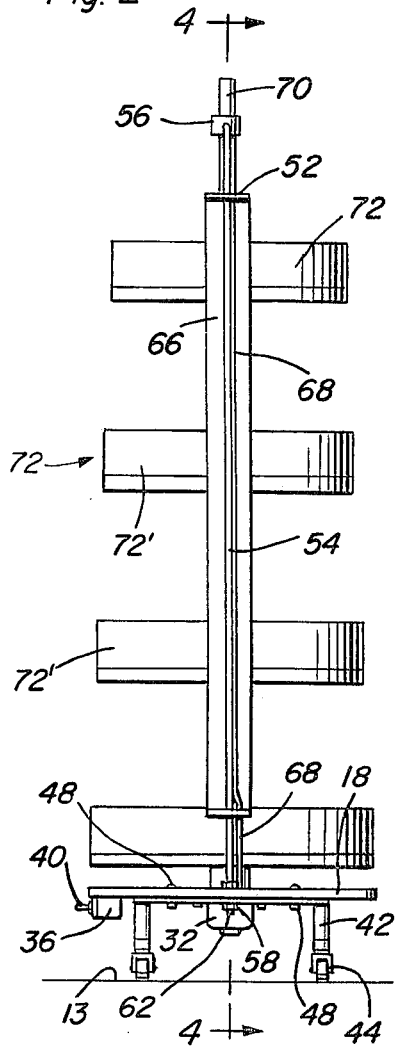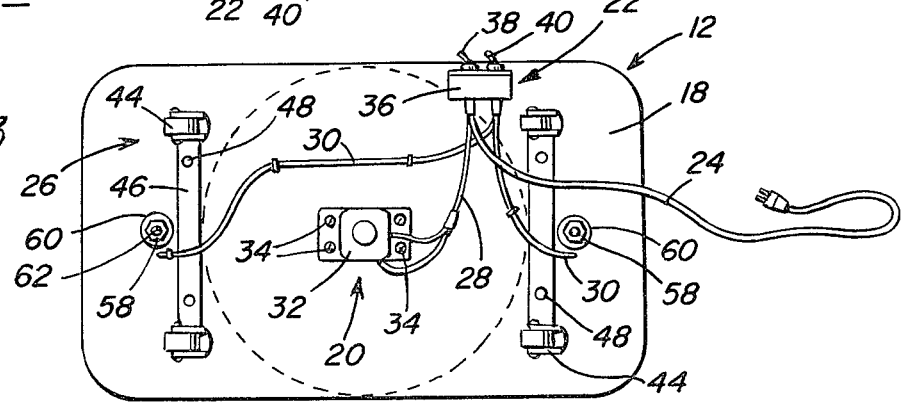

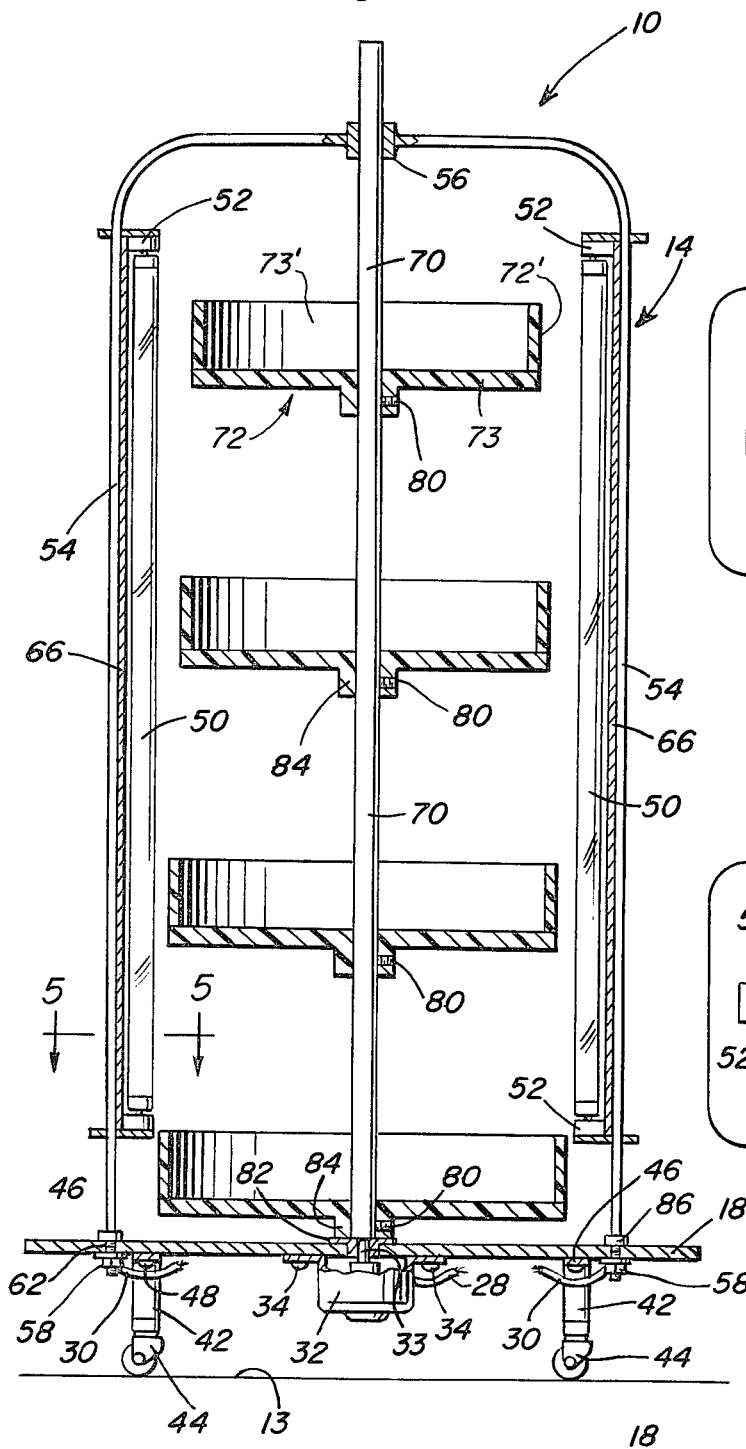

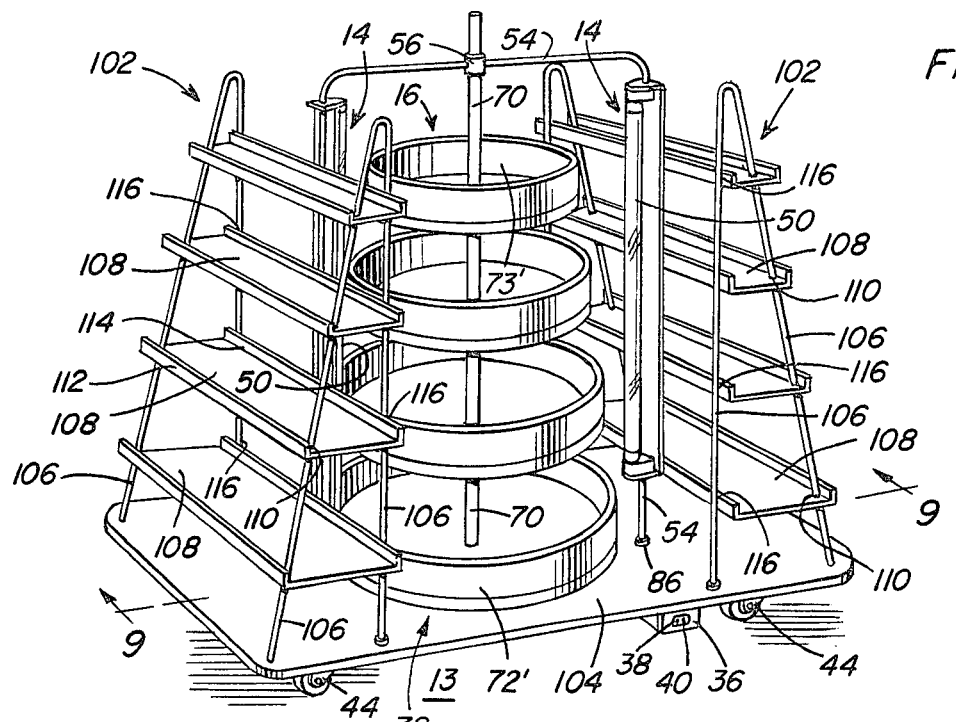
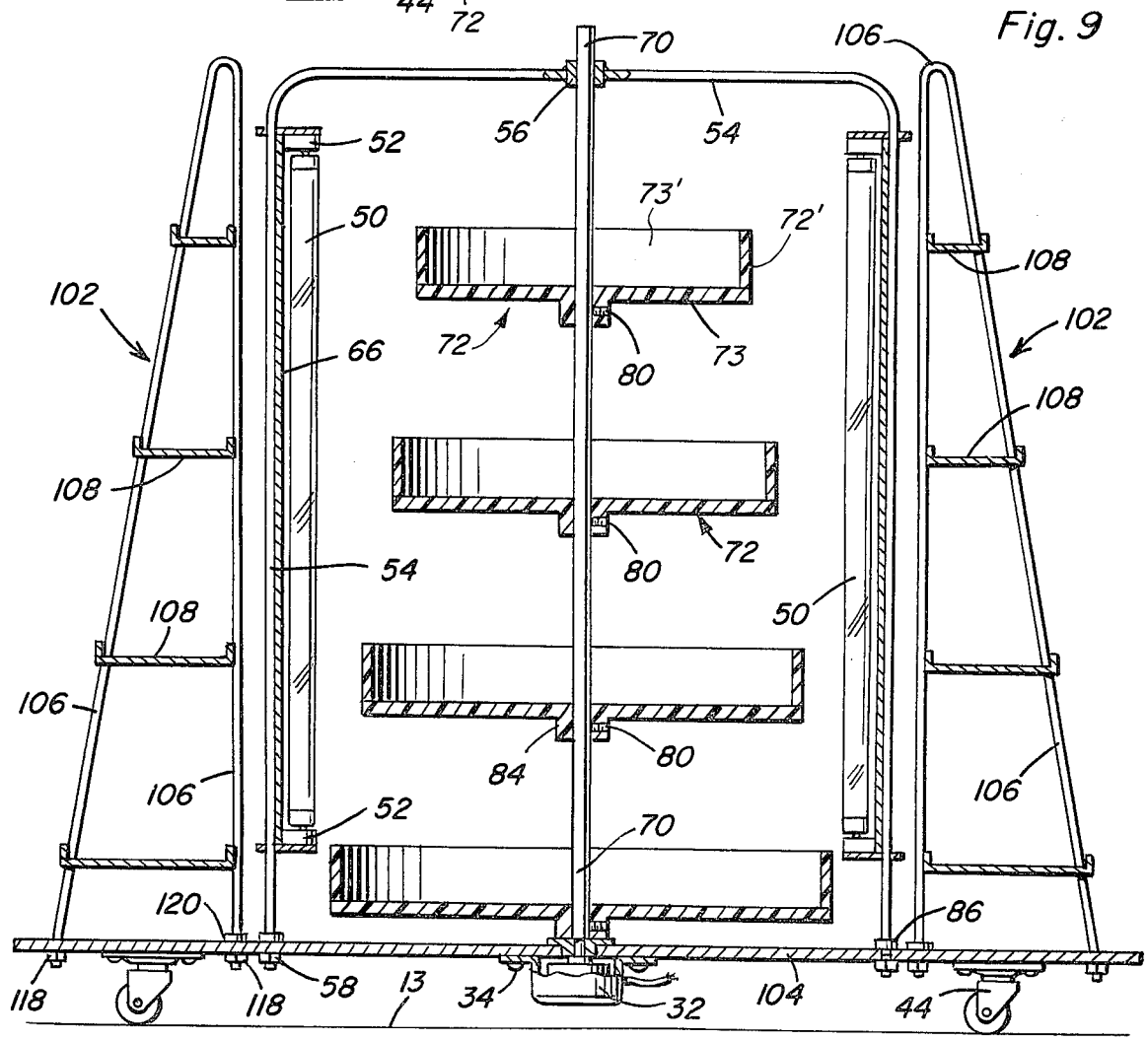

SUPPORTING STRUCTURE FOR PLANTS

BACKGROUND OF THE INVENTION

1. Field of the Invention

This invention relates to a supporting structure for plants, specifically to a plurality of trays for holding plants and soil in an arrangement of decorative or garden plants, along with lighting means for illuminating the plants. Individual centrally mounted trays can be rotated by a motor or other suitable means for distributing the illumination and displaying the plants such as for selling purposes.

2. Disclosure Statement

Teach in U.S. Pat. No. 2,310,718, issued Feb. 9, 1943, discloses a display case having concentrically disposed shelving rotatable about a centrally driven shaft and illuminated by a plurality of vertically arranged fluorescent tubes. Teach does not, however, disclose a plant supporting structure, nor would such a utility be practical with the provision of a glass dome as suggested by Teach, which would be expected to hinder free circulation of gases and prevent air circulation to any plants inside. In U.S. Pat. No. 2,720,056, issued Oct. 11, 1955 to Levy, a plurality of flower containers is supported on a central pole with a fluorescent tube therein for illuminating the plants contained in the containers. A disadvantage associated with the structure of Levy, however, is poor distribution of light inherent in the centrally disposed illuminating means, leading to poor absorption of incident light by the leaves of the plant, as well as poor illumination of the plants for display purposes.

Other centrally supported display platforms are illustrated in U.S. Design Pat. No. 129,636, showing a design for a fluorescent display lamp; in U.S. Pat. No. 3,674,612, issued July 4, 1972 to Gehl, Jr., disclosing a tree-like display stand in a generally conical shape to stylistically suggest a Christmas tree, along with direct or indirect lighting, such as a string of lights; and Schick, U.S. Pat. No. 2,540,353, issued Feb. 6, 1951, shows a display fixture having a plurality of shelves supported in vertical spaced relation by a plurality of vertical columns with sources of illumination. Ware in U.S. Pat. No. 3,664,063, issued May 23, 1972, shows a plant growth device where plants are supported on shelves and exposed to fluorescent illumination by a bank of horizontally arranged fluorescent tubes.

All of the structures disclosed above suffer from the disadvantage of non-portability associated with the vases mounted on a fixed base, with fixed shelving and, in many cases, poor illumination of articles on the shelving. Furthermore, none of the devices disclosed in the listed references combines rotatable trays specifically for holding plants, along with vertical illumination. Accordingly, all prior attempts to develop a versatile and portable supporting structure for plants, usable either for display or for gardening purposes, have been unsuccessful.

SUMMARY OF THE INVENTION

A plurality of preferably circular trays arranged concentrically in spaced relation on a central supporting rod are adapted to contain garden plants, house plants, or the like, in a suitable natural or artificial soil preparation. Lighting means are provided to illuminate the plants for viewing or for furnishing radiant energy necessary for promoting photosynthesis. Moreover, a drive means, such as a motor with suitable gearing, can impart rotary motion to the central support rod to cause the plurality of trays to rotate slowly for display purposes and for providing even distribution of light on the plants over a period of time. The central support rod and the lighting means are preferably supported on a base plate mounted on lockable wheel means which permit the entire supporting structure to be moved on a flat surface in any desired direction. Preferably, the trays are of different sizes, arranged with the smallest tray highest on the central support rod, with preferably a regularly increasing size at successive lower positions on the rod.

In a second form of the invention, a plurality of said shelves arranged in fixed relationship on the base plate can accommodate additional articles, such as potted plants.

Accordingly, it is an object of the present invention to provide a support structure for plants where the plants are contained within a plurality of trays mounted on a central rotatable support rod, the trays being rotatable for display purposes or for promoting even distribution of illumination.

Another object is to provide a plurality of shapes of such trays, including such shapes as circular, square, octagonal, and the like.

Still another object is to provide illuminating means in the form of vertically oriented fluorescent tubes which provide continuous, economical incident radiation on the plants for display and for photosynthesis purposes.

Yet another object is to provide a supporting structure which includes a base plate on which the central support rod and lighting means are mounted, the base plate having wheel means for movement of the device in any desired direction.

A further object is to provide a support structure for plants used for decorative purpose, such as house plants, or for gardening purposes, such as for growing vegetables for salads throughout the entire year, even in climates where climatic conditions prevent growing of plants a substantial portion of the year.

Still a further object is to provide powered drive means for rotation of the central support rod, such as an electric motor and suitable gearing to permit slow rotation of the trays.

Yet a further object is to construct the trays in different sizes, preferably in regularly decreasing size with the smallest mounted highest on the support rod.

Another further object is to provide a second form of the invention wherein side shelves are mounted in fixed position on the base plate, the side shelves being adapted for supporting additional articles, such as potted plants.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the first form of the invention, showing a plurality of circular trays containing soil and growing plants.

FIG. 2 is a side elevational view of the device of FIG. 1 having no plants or soil in the trays.

FIG. 3 is a bottom plan view of the device of FIG. 2, showing the association of motor and wheel means mounted on the bottom of the base plate.

FIG. 4 is a sectional view of the device of FIG. 2, taken substantially upon a plane passing along section line 4—4 on FIG. 2.

FIG. 5 is a sectional view of the illuminating means on one side of the device of FIG. 4, taken substantially upon a plane passing along section line 5—5 on FIG. 4.

FIG. 6 is a top plan view of a device similar to FIG. 1, but having square trays.

FIG. 7 is a top plan view of another device, where the trays are octagonal in shape.

FIG. 8 is a perspective view of the second form of the invention, where the base plate supports on each side a plurality of fixed shelves for holding additional articles, such as potted plants.

FIG. 9 is a sectional view of the device of FIG. 8, taken substantially upon a plane passing along section line 9—9 on FIG. 8.

DESCRIPTION OF THE PREFERRED EMBODIMENTS

The first form of the invention is designated generally by the numeral 10 in FIG. 1, and comprises base assembly 12, illumination assembly 14, and container assembly 16. Base assembly 12 rests on flat surface 13 and is composed base plate 18, motor assembly 20, switch means 22, power cord 24, wheel assemblies 26, motor cords 28, and illuminating cords 30. Motor assembly 20 is made of electrical motor 32 mounted on base plate 18 by fasteners 34. When base plate 18 is wood, fasteners 34 will preferably be wood screws, although when base plate 18 is metal, fasteners 34 can be, for instance, bolts, rivets, or other suitable equivalent fastening means. Switch means 22 comprises electrical box 36, motor toggle switch 38, which closes the electrical circuit to supply power to motor 32, and light toggle switch 40 which closes the circuit to supply power to illuminating means 14 through electrical lines 30. Wheel means 26 comprises wheel supports 42, caster wheels 44, which are preferably lockable by manualy engageable locking means (not shown), and mounting bracket 46, fastened to support base 18 by fastening means 48, which can be rivets, bolts, or other suitable fasteners.

Illuminating means 14 comprises fluorescent bulbs 50 mounted by receptacles 52, which are in turn held by metal arms 54. Arms 54 are joined at collar 56, and are anchored to support base 18 by nuts 58 and washers 60. Accordingly, the lower portions 62 of arms 54 are threaded to receive compatibly threaded nuts 58. Reflector 66 is mounted on receptacles 52, each reflector 66 resting upon arm 54 and enhancing the distribution of light on plants contained within container assembly 16. Details of the illumination assembly are apparent in FIG. 5. Wire 68, which is an extension of electrical line 30 above base support 18, leads to the upper receptacle 52 and provides current to illuminate bulbs 50.

Central support rod 70 anchors collar 56 near its upper extent, and is mounted on support base 18 in engagement with output shaft 33 of motor 32, preferably with gear means (not shown) to provide a desired rate of rotation of rod 70. Trays 72, which vary in size in a regular fashion as seen in FIGS. 1 and 4, are formed of vertical side wall or walls 72' defining an outer periphery, and a bottom 73, to form enclosure 73' which contains plant soil 74 in which plants 76 are growing. Trays 72 are mounted on support rod 70 in regularly spaced relation and rotate with rod 70 as driven by shaft 33 of motor 32. Alternatively, rod 70 can be manually rotated without provision of motor 32. Trays 72 are held on support rod 70 by set screws 80, which are preferably provided with an Allen head for adjustably tightening tray 72 to any desired position on rod 70. Washer 82 is placed on base plate 18 to facilitate slippage upon rotation of the lowermost tray 72 at its mounting knob 84. Arm 54 is provided with sleeve 86, against which nut 58 acts in mounting arm 54 to base plate 18.

Alternative tray designs are shown in FIGS. 6 and 7. In FIG. 6, square trays 90 are arranged on support rod 70 in decreasing size upwardly on support rod 70. In FIG. 7, octagonal trays 92 are similarly shown.

An important feature of the invention resides in the accessability of all plants 76 in trays 72 to a viewer observing from any direction, inasmuch as rotation of trays 72, either manually or by an electrically powered motor, permits any desired plant or arrangement of plants to be moved nearest the direction of observation. Moreover, when a motor is used to cause slow rotation of container assembly 16 with support rod 70 sliding within collar 56, an even distribution of light on plants 76 from illuminating assembly 14 is achieved. With the arrangement of illuminating bulbs 50 shown in FIG. 1, and with rotation of trays 72 as described, a very nearly even distribution of light is obtained for any plants 76, irrespective of location within one of trays 72, including those located near the periphery of tray 72, as well as those located more centrally in tray 72. Such an even distribution of light on a time average promotes control of growing conditions for plants 76, as well as enhancing the visual effect when a decorative purpose is intended.

The arrangement of FIG. 1, where successively smaller trays 72 are mounted upwardly on rod 70, furthers promotes visual observation of the plants 76 from the usual vantage point above device 10. Moreover, access to individual trays 72 for planting, watering, or otherwise attending to the plants is facilitated.

It will be understood that a suitable wiring arrangement in box 36, well known to those skilled in the art, permits power cord 24 to supply the needs of both motor 32 and illuminating assembly 14, which are wired in parallel and independently switchable with switches 38 and 40.

A particularly striking decorative effect can be achieved from the device shown in FIG. 6 by utilizing the corners 96 of trays 90 to accentuate particularly colorful, unusual, or decorative plants placed in the vicinity of corners 96. Moreover, the square configuration of trays 90 lends itself to greater visual interest when continuous slow rotation is undertaken about support rod 70. Substantially the same combination of advantages is achievable with the octagonal tray configuration of FIG. 7. In either of the alternative configurations of FIGS. 6 and 7, somewhat simpler manufacturing techniques can be employed for mass production of the trays, inasmuch as conventional woodworking techniques not involving specialized fabrication of circular walls required in forming trays 72, can be used.

In use, the supporting structure of the present invention can be used for enhancing the decor of a residential or office environment, for selling purposes, or for growing vegetables, such as for salads, throughout the entire year. Furthermore, the device can be made in any size for a multiplicity of particular uses, including a relatively small size for individual use, as well as larger sizes adaptable for greenhouse use.

The second form of the invention, illustrated in FIGS. 8 and 9, differs from the first form, described hereinabove, in providing side shelf assemblies 102 on each side of container assembly 16 and illuminating assembly 14. Base plate 104 has sufficient breadth to accommodate side shelf assemblies 102. Wheels 44 are mounted sufficiently near the periphery of base plate 104 to impart stability to the entire device and to prevent tipping.

Side shelf assemblies 102 are made up of support framework 106, which is formed from a plurality of metal rods bent to a V-shaped configuration and mounted on support plate 102 in an inverted configuration, as shown in FIG. 8. Side shelves 108, which vary in size with the smallest shelf mounted at the top, are provided with mounting holes 110, through which the outer leg of framework 106 passes. Shelves 108 are provided with outside flanges 112 and inside flanges 114, inside flange 114 being spot welded at points 116 to the inner leg of framework 106. Alternatively, brazing, welding, bolting, or other suitable fastening means can be used. Framework 106 is secured to base plate 104 by nuts 118, which act cooperatively with sleeve 120 on framework 106 to secure framework to base plate 104. The bend in the outer leg of framework 106 provides a suitable anchor against which the corresponding nut 118 can act.

Side shelf assembly 102 is particularly suited for carrying smaller objects, particularly of a decorative nature, such as potted plants or the like.

Inasmuch as many of the components of illumination assembly 14 and container assembly 16 are identical to those features of the first form of the invention as shown and described in connection with FIGS. 1-5, it will be understood that in purpose and function, components having like numerals perform in the same manner as in the first form of the invention.

The portability of both forms of the invention afforded by wheels 44 and associated parts is an important advantages in faciliting movement of the device, particularly when larger devices, such as for greenhouse use, are employed. When it becomes necessary or convenient to move the device, it can be important to do so without appreciably disturbing plants 76 held in trays 72. With use of the wheels of the present invention, such motion is facilitated and occurrence of damage to the contents of trays 72 is minimal.

It is further to be noted that the mounting of bulbs 50 on the inside of arms 54 serves a protective function in the first form of the invention, inasmuch as rod 54, as well as reflector 66, serves to deflect any inadvertent blows to device 10 from the side.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A structure for supporting growing plants comprising a rotatable container assembly, means for rotating said assembly, a plurality of elongated vertically disposed illuminating means for illuminating the plants, and a base assembly resting on a flat surface and supporting the container assembly and the illuminating means, the container assembly holding the growing plants and moving with respect to the illuminating means in regularly recurring fashion so as to effect substantially uniform illuminating of all plants held in the container assembly, said container assembly comprising a plurality of trays including a vertical periphery and a bottom to form an enclosure for holding soil for supporting growing plants and a central vertically disposed support rod rotatably mounted on the base assembly and supporting the trays in a vertically spaced relation on the rod for rotation about a horizontal plane, said base assembly comprising a flat base plate and support means extending upwardly therefrom which support said illuminating means outside the periphery of the trays, said illuminating means extending upwardly substantially throughout the vertical extent of said container assembly, whereby the illuminating means illuminates the plants held in the trays.

2. The structure of claim 1 wherein said means for rotating said assembly comprises an electrical motor dependingly mounted under the base plate for rotation of the central support rod, the base assembly comprising electrical switch means mounted on the lower surface of the base plate and electrical lines for carrying electrical power from the switch means to the illumination means and to the motor.

3. The structure of claim 1 wherein said illuminating means comprises a pair of fluorescent bulbs which are secured to said support means, said support means comprising a pair of arms joined to a collar slidably retained upon the upper portion of said central support rod, each of the arms containing a substantially vertical section for supporting one of said fluorescent bulbs, the bulbs being mounted to the vertical section of the arm by a pair of receptacles mounted on the arm, each arm having an end anchored by fastening means to the base plate.

4. The structure of claim 3 wherein said base assembly further comprises wheel means dependingly attached to the base plate, for moving the structure over the flat surface in any desired direction.

5. The structure of claim 4 wherein said wheel means comprises four caster wheels mounted on the base plate by mounting means so as to provide sufficient clearance above the flat surface for the motor.

6. The structure of claim 5 wherein said illuminating means further comprises a reflector mounted to said receptacles between the fluorescent bulb and the arm, whereby light from the fluorescent bulb is reflected into the direction of the container assembly.

7. The structure of claim 6 wherein said trays are circular.

8. The structure of claim 6 wherein said trays are square.

9. The structure of claim 6 wherein said trays are octagonal.

10. The structure of claim 1 further including a side shelf assembly supported by said base plate, said side shelf assembly comprising a pair of frameworks to secure said assembly to said base plate and support a plurality of side shelves, each framework being mounted adjacent said illuminating means.

11. The structure of claim 1 wherein said trays have different widths and are arranged on said vertically disposed support rod according to width, largest to smallest upwardly along said vertical disposed support rod.

* * * * *